Sept. 10, 1940.  E. W. SAGRAVES  2,214,146
REAR WHEEL SUSPENSION FOR AUTOMOBILES
Filed Sept. 26, 1939  3 Sheets-Sheet 1

Inventor
Edward W. Sagraves
By Clarence A. O'Brien
and Hyman Berman
Attorneys

Sept. 10, 1940.   E. W. SAGRAVES   2,214,146
REAR WHEEL SUSPENSION FOR AUTOMOBILES
Filed Sept. 26, 1939   3 Sheets-Sheet 2
Fig. 2.
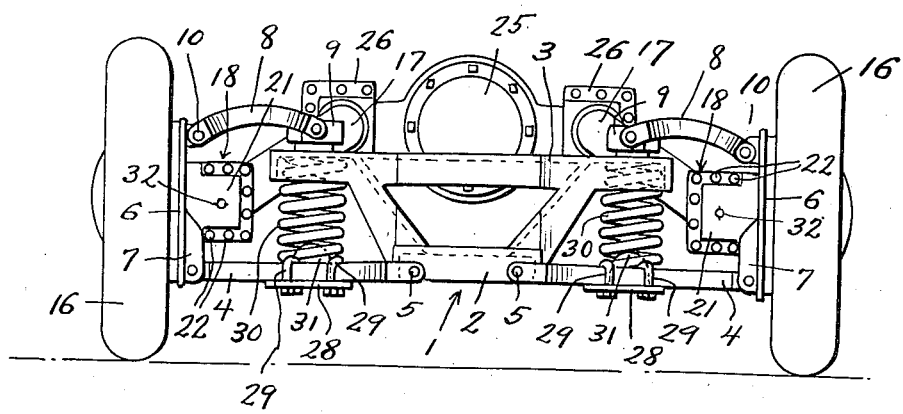
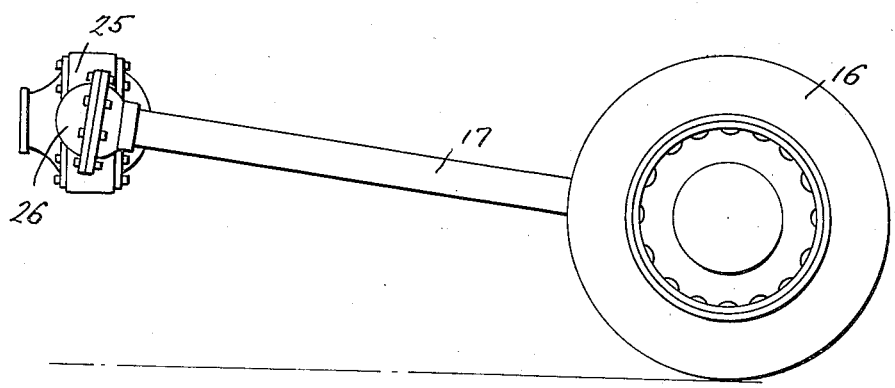
Fig. 3.
Inventor
Edward W. Sagraves
By Clarence A. O'Brien
and Hyman Berman
Attorneys Sept. 10, 1940.  E. W. SAGRAVES  2,214,146
REAR WHEEL SUSPENSION FOR AUTOMOBILES
Filed Sept. 26, 1939  3 Sheets-Sheet 3

Inventor
Edward W. Sagraves

By Clarence A. O'Brien
and Hyman Berman
Attorneys

Patented Sept. 10, 1940

2,214,146

UNITED STATES PATENT OFFICE 2,214,146

REAR WHEEL SUSPENSION FOR AUTOMOBILES

Edward W. Sagraves, Chillicothe, Ohio

Application September 26, 1939, Serial No. 296,650

2 Claims. (Cl. 180—73)

The present invention relates to new and useful improvements in rear wheel suspensions for automobiles and has for its primary object to provide, in a manner as hereinafter set forth, a novel construction and arrangement whereby the rear wheels of the vehicle may move independently of each other.

Another very important object of the invention is to provide a rear wheel suspension of the aforementioned character for automobiles which may be expeditiously removed as a unit when desired.

Still another very important object of the invention is to provide a rear wheel suspension of the character described embodying an arrangement of springs which is such that riding comfort in the vehicle and roadability of the vehicle will be materially promoted.

Other objects of the invention are to provide a rear wheel suspension for automobiles which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in rear elevation.

Figure 3 is a side elevational view.

Figure 1:
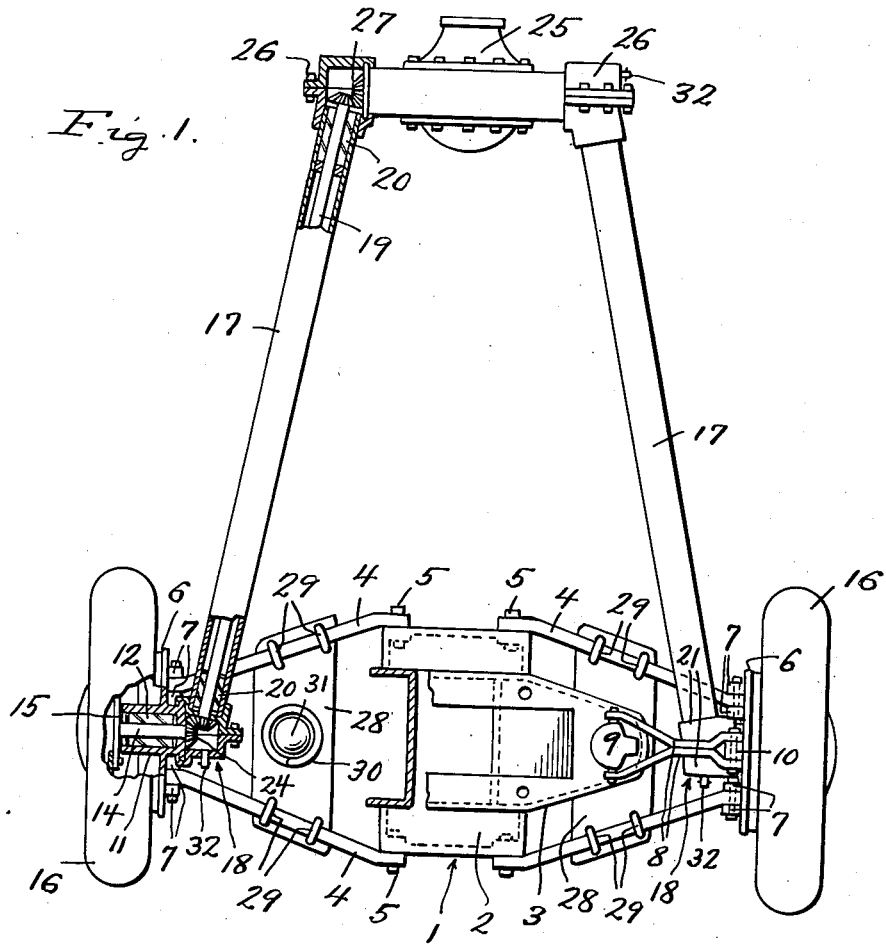
Figure 1 is a top plan view of a rear wheel suspension constructed in accordance with the present invention, portions thereof being broken away and shown in section.

Referring now to the drawings in detail, it will be seen that the embodiment of the invention which has been illustrated comprises what may be referred to as a frame structure of suitable metal which is designated generally by the reference numeral 1. The frame structure 1 includes a longitudinally elongated lower portion 2 and a transversely elongated upper portion 3.

Figure 5:
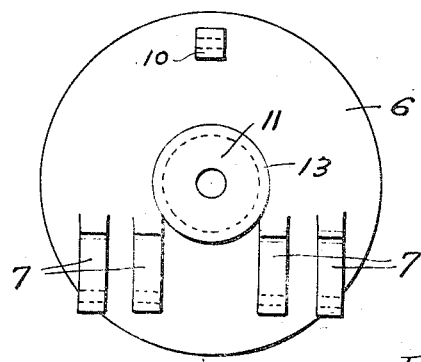
Figure 5 is an elevational view of one of the wheel hubs, looking at the inner end thereof.

The reference numeral 4 designates outwardly converging pairs of metallic arms having their inner ends pivotally secured to the lower portion 2 of the frame structure 1 for swinging movement in a vertical plane, as at 5. Pivotally mounted on the outer ends of the pairs of arms 4 are brake backing plates 6. Pairs of ears 7 (see Fig. 5) are provided on the lower portions of the brake backing plates 6 between which the arms 4 are journaled. Parallel links 8 have their inner ends pivotally connected to suitable perches 9 on the end portions of the upper portion 3 of the frame structure 1 and their outer ends pivotally connected to the upper portions of the brake backing plates 6, as at 10. Thus, the brake backing plates 6 are capable of upward and downward movement relative to the frame structure 1 but will be retained in a true vertical plane.

Figure 4:
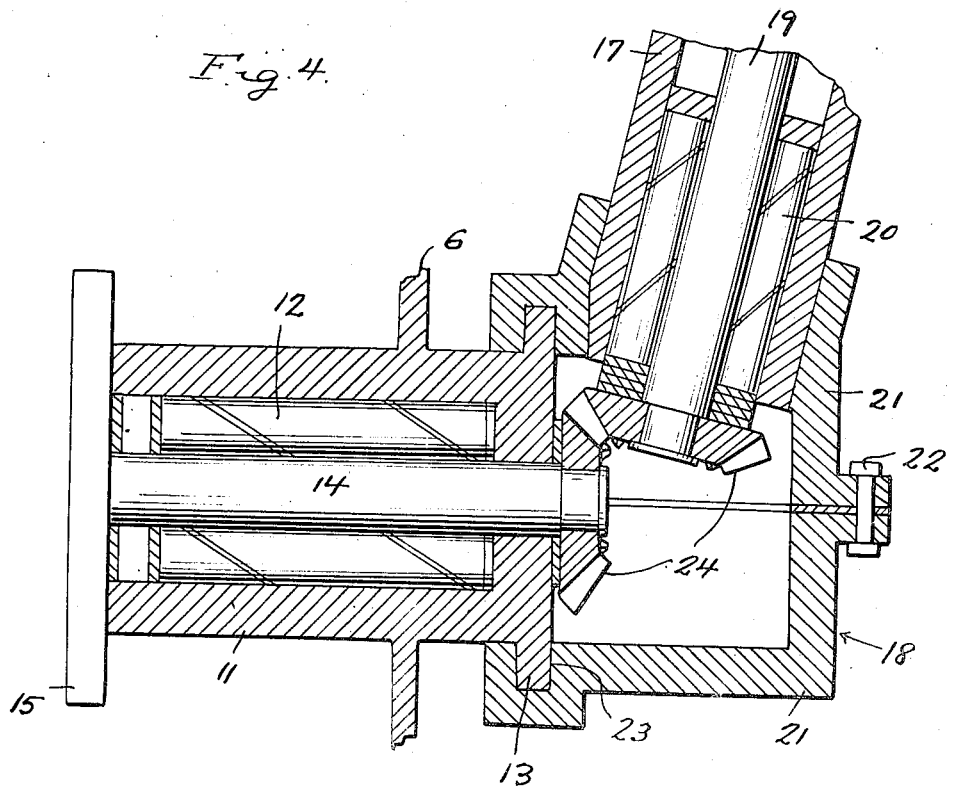
Figure 4 is a view in horizontal section through one of the rear wheel drive units.

Extending through the brake backing plates 6 are cylindrical casings 11 which enclose roller bearings 12. The inner ends of the casings 11 are closed and provided with flanges 13. This is shown to advantage in Fig. 4 of the drawings. Journaled in the bearings 12 are axles 14 having discs 15 on their outer ends to which the rear wheels 16 of the vehicle are bolted.

The reference numeral 17 designates a pair of tubular housings having their rear ends pivotally connected to the inner ends of the cylinders 11 by couplings 18. The housings 17 enclose drive shafts 19 for which suitable roller bearings 20 are provided. Referring again to Fig. 4 of the drawings, it will be observed that the couplings 18 comprise separable sections 21 which are bolted together, as at 22. Further, the couplings 18 are formed to provide channels or grooves 23 in which the flanges 13 are journaled in a manner to rotatably secure said couplings on the cylinders 11. Beveled gears 24 in the couplings 21 operatively connect the axles 14 to the drive shafts 19. The forward ends of the housings 17 are pivotally connected to a differential unit 25 through the medium of couplings 26 which are substantially similar to the couplings 18. Beveled gears 27 operatively connect the drive shafts 19 to the differential unit 25.

The reference numeral 28 designates spring platforms which are secured beneath the pairs of arms 4 through the medium of U-bolts 29. Mounted on the platforms 28 are coil springs 30. The upper ends of the coil springs 30 are engaged beneath the end portions of the upper portion 3 of the frame structure 1. Vertically opposed resilient bumpers 31 are provided within the springs 30 on the platforms 28 and beneath the end portions of the upper portion 3 of the frame structure 1. Fittings 32 are provided at suitable points for lubricating the moving parts.

It is thought that the operation of the invention will be readily apparent from a consideration of the foregoing. Of course, the weight of the vehicle is transmitted to the wheels 16 through the coil springs 30. As the automobile passes over irregularities the rear wheels 16 thereof swing upwardly and downwardly independently of each other on the pairs of arms 4. The links 8 maintain the wheels 16 in a true vertical position at all times.

It is believed that the many advantages of a rear vehicle wheel suspension constructed in accordance with the present invention will be readily understood and although a preferred embodiment of the device is as illustrated and described, it is to be understood that changes in the details of construction and in the combination and arrangement of parts may be restored to which will fall within the scope of the invention as claimed.

What is claimed is:

1. In a motor vehicle including a differential unit, a rear wheel suspension comprising a frame structure, pairs of arms pivotally mounted for swinging movement in a vertical plane on the lower portion of the frame structure and projecting laterally therefrom, brake backing plates pivotally mounted on the outer ends of the pairs of arms, links having one end pivotally connected to the upper portion of the frame structure and their other ends pivotally connected to the backing plates, axles journaled in the backing plates, wheels mounted on said axles, tubular housings having one end pivotally connected to the differential unit and their other ends pivotally connected to the backing plates, drive shafts journaled in said housings, gears connecting said drive shafts to the differential unit for actuation thereby, gears operatively connecting the axles to the drive shafts for actuation thereby, and coil springs mounted between the frame structure and the arms for yieldingly resisting upward swinging movement of the latter.

2. A rear wheel suspension for automobiles comprising a frame structure, pairs of arms having one end pivotally connected to the frame structure for swinging movement in a vertical plane, brake backing plates pivotally mounted on the other ends of said arms, links having one end pivotally connected to the frame structure and their other ends pivotally connected to the backing plates for retaining said backing plates in a substantially vertical position, cylinders extending horizontally through the backing plates, bearings in said cylinders, axles journaled in said bearings, wheels mounted on said axles, drive shafts operatively connected to the axles, tubular housings enclosing said drive shafts, couplings pivotally connecting said housings to the cylinders, and coil springs mounted between the pairs of arms and the frame structure for yieldingly resisting upward swinging movement of said arms.

EDWARD W. SAGRAVES.